United States Patent
Yoshida et al.

(10) Patent No.: US 11,794,592 B2
(45) Date of Patent: Oct. 24, 2023

(54) DRIVE CONTROL DEVICE AND DRIVE DEVICE FOR RAILROAD CARS

(71) Applicant: Mitsubishi Electric Corporation, Tokyo (JP)

(72) Inventors: Taichi Yoshida, Tokyo (JP); Naoki Nishio, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 539 days.

(21) Appl. No.: 17/057,128

(22) PCT Filed: Jun. 22, 2018

(86) PCT No.: PCT/JP2018/023820
§ 371 (c)(1),
(2) Date: Nov. 20, 2020

(87) PCT Pub. No.: WO2019/244343
PCT Pub. Date: Dec. 26, 2019

(65) Prior Publication Data
US 2021/0188100 A1    Jun. 24, 2021

(51) Int. Cl.
*H02M 3/07*    (2006.01)
*B60L 50/13*    (2019.01)
(Continued)

(52) U.S. Cl.
CPC ............. *B60L 50/13* (2019.02); *H02M 1/36* (2013.01); *H02M 5/458* (2013.01);
(Continued)

(58) Field of Classification Search
CPC ......... H02M 1/36; H02M 5/458; H02M 1/007
See application file for complete search history.

(56) References Cited

U.S. PATENT DOCUMENTS

| | | | |
|---|---|---|---|
| 2011/0190970 A1* | 8/2011 | Moriya | F02D 29/06 180/65.265 |
| 2013/0062941 A1* | 3/2013 | Yamamoto | B60L 3/0092 307/10.6 |

(Continued)

FOREIGN PATENT DOCUMENTS

| JP | 2007089264 A | 4/2007 |
|---|---|---|
| JP | 2011240863 A | 12/2011 |

(Continued)

OTHER PUBLICATIONS

Office Action dated Mar. 2, 2021 issued in corresponding Japanese Patent Application No. 2020-525200, with English translation (8 pages).

(Continued)

*Primary Examiner* — Muhammad S Islam
(74) *Attorney, Agent, or Firm* — BUCHANAN INGERSOLL & ROONEY PC

(57) ABSTRACT

A main converter (i) converts AC power from a generator at a primary terminal into DC power at a secondary terminal, an internal combustion engine driving the generator to generate the AC power, or (ii) converts DC power at the secondary terminal into AC power and supplies the AC power to the generator. A first inverter is connected to the secondary terminal of the main converter. A step-down circuit steps down a voltage of the DC power output by the main converter and supplies the stepped-down DC power to a power storage device. The generator, using the power storage device as an electric power source, operates as an electric motor to start the internal combustion engine. After the internal combustion engine is started, the DC power output by the main converter is supplied to the first inverter, stepped down by the step-down circuit, and supplied to the power storage device.

20 Claims, 12 Drawing Sheets

(51) Int. Cl.
  *H02M 1/36* (2007.01)
  *H02M 5/458* (2006.01)
  *H02M 1/00* (2006.01)

(52) U.S. Cl.
  CPC ....... *B60L 2200/26* (2013.01); *B60L 2210/10* (2013.01); *B60L 2210/30* (2013.01); *B60L 2240/80* (2013.01); *H02M 1/007* (2021.05)

(56) References Cited

U.S. PATENT DOCUMENTS

2014/0225430 A1* 8/2014 Oyobe .................... B60L 58/12
                                                    307/9.1
2018/0222328 A1* 8/2018 Tokito .................... B60L 50/13

FOREIGN PATENT DOCUMENTS

| JP | 2014091504 A | 5/2014 |
| JP | 2014117120 A | 6/2014 |
| JP | 2017030410 A | 2/2017 |

OTHER PUBLICATIONS

International Search Report (PCT/ISA/210) dated Sep. 25, 2018, by the Japan Patent Office as the International Searching Authority for International Application No. PCT/JP2018/023820.
Written Opinion (PCT/ISA/237) dated Sep. 25, 2018, by the Japan Patent Office as the International Searching Authority for International Application No. PCT/JP2018/023820.
Japanese Office Action (Notification of Reasons for Refusal) dated Oct. 13, 2020, issued in corresponding Japanese Patent Application No. 2020-525200, and a English Translation thereof. (4 pages)
Office Action issued in corresponding China Patent Application No. 201880094722.4, dated Jan. 10, 2023, 23 pages including 12 pages of Partial English translation.
Office Action dated Mar. 24, 2021, for corresponding Indian patent Application No. 202027045739, 6 pages.

* cited by examiner

DRIVE CONTROL DEVICE AND DRIVE DEVICE FOR RAILROAD CARS

TECHNICAL FIELD

The present disclosure relates to a drive control device and a railway vehicle driving apparatus.

BACKGROUND ART

Some types of vehicle driving apparatuses for driving a railway vehicle employ a generator and an electric motor. Patent Literature 1 discloses an example of such a vehicle driving apparatus. The vehicle driving apparatus disclosed in Patent Literature 1 includes an internal combustion engine, an induction generator driven by the internal combustion engine, a converter, an inverter that drives an induction electric motor, and a power storage device. Since the internal combustion engine cannot perform self-starting, this vehicle driving apparatus, when starting the internal combustion engine, uses the converter to convert direct current (DC) power supplied from the power storage device into alternating current (AC) power and to supply the AC power to the induction generator. This causes the induction generator attached to the internal combustion engine to operate as an electric motor to apply a torque from the induction generator, thereby causing the internal combustion engine to start.

CITATION LIST

Patent Literature

Patent Literature 1: Unexamined Japanese Patent Application Publication No. 2014-91504

SUMMARY OF INVENTION

Technical Problem

To start the internal combustion engine in the manner as described above, the power storage is required to store sufficient power. Thus the vehicle driving apparatus disclosed in Patent Literature 1, after the internal combustion engine is started, charges the power storage device using AC power that is output from the induction generator driven by the internal combustion engine, in order to enable the next starting of the internal combustion engine. Specifically, the converter included in the vehicle driving apparatus converts the AC power output from the induction generator into DC power suitable for charging of the power storage device and supplies the DC power to the power storage device. When the charging of the power storage device ends, the vehicle driving apparatus converts the AC power output from the induction generator into DC power suitable for driving of the induction electric motor by the inverter and supplies the DC power to the inverter. An output voltage of the converter when supplying power to the power storage device is lower than an output voltage of the converter when supplying power to the inverter. Thus, according to the vehicle driving apparatus, power is not supplied to the inverter during a period in which power is supplied to the power storage device. In other words, even after the internal combustion engine is started, the railway vehicle cannot run during a period in which the power storage device is being charged. This causes a problem in that the railway vehicle cannot run immediately after the internal combustion engine is started.

The present disclosure is made in view of the above-described circumstances, and an objective of the present disclosure is to provide a drive control device and a railway vehicle driving apparatus that enable running of a railway vehicle after an internal combustion engine is started and during charging of a power storage device.

Solution to Problem

To achieve the aforementioned objective, a drive control device according to the present disclosure is a drive control device for controlling a railway vehicle driving apparatus for driving a railway vehicle using, as a motive power source, an internal combustion engine, and includes a main converter, a first inverter, a step-down circuit, and a converter controller. The main converter converts alternating current (AC) power supplied from a generator to a primary terminal thereof into direct current (DC) power and outputs the DC power from a secondary terminal thereof, the internal combustion engine driving the generator to generate and output the AC power, or converts DC power supplied to the secondary terminal into AC power and supplies the AC power to the generator. The first inverter converts the DC power output from the secondary terminal of the main converter into AC power and outputs the AC power to an electric motor. The step-down circuit steps down a voltage of the DC power output from the secondary terminal of the main converter and supplies the stepped-down DC power to a power storage device. The converter controller controls power conversion performed by the main converter. The main converter, when the converter controller acquires a start command providing instruction for starting of the internal combustion engine, converts DC power supplied from the power storage device into AC power and supplies the AC power to the generator. The main converter, after the internal combustion engine is started, converts the AC power output by the generator into DC power and supplies the DC power to the first inverter and the step-down circuit.

Advantageous Effects of Invention

According to the present disclosure, the step-down circuit steps down an output voltage of the main converter and supplies power to the power storage device with the stepped down output voltage. Thus, the output voltage of the main converter can be set, after the internal combustion engine is started, at a voltage that is higher than a voltage suitable for charging of the power storage device and is suitable for driving of the electric motor by the first inverter. This enables driving of the electric motor while charging the power storage device with a stepped down output voltage of the main converter, and thus enables running of the railway vehicle after the internal combustion engine is started and during charging of the power storage.

DESCRIPTION OF EMBODIMENTS

Figure 1:
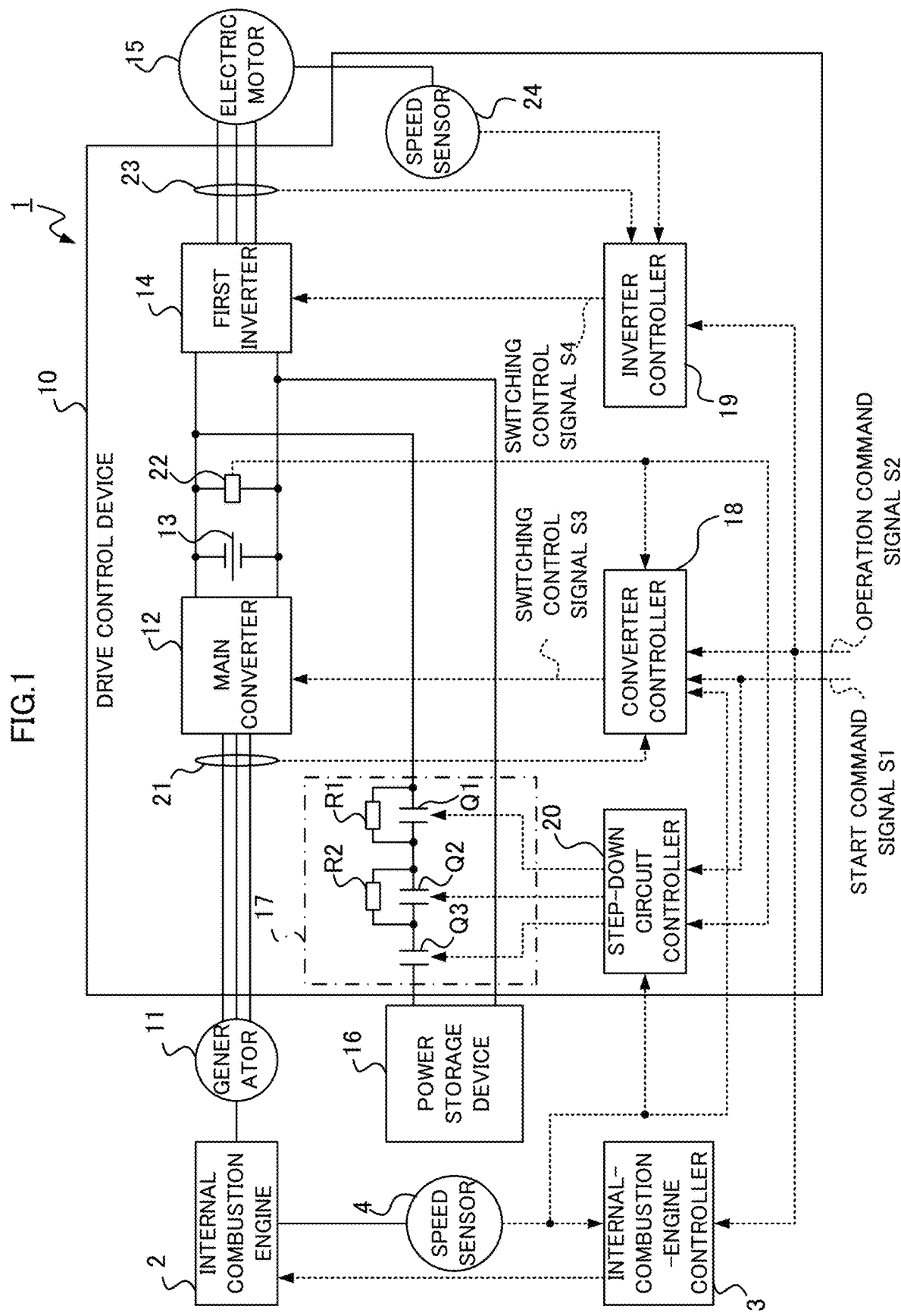
FIG. 1 is a block diagram illustrating configuration of a railway vehicle driving apparatus according to Embodiment 1 of the present disclosure.

Hereinafter, a railway vehicle driving apparatus according to embodiments of the present disclosure is described in detail with reference to the drawings. In the drawings, the same or similar components are denoted by the same reference signs.

Embodiment 1

As described in Embodiment 1 below, a railway vehicle driving apparatus 1 (hereinafter referred to as "the driving apparatus") includes: an internal combustion engine 2 that serves as a motive power source; an internal-combustion-engine controller 3 that controls the internal combustion engine 2; a speed sensor 4 that detects an engine speed of the internal combustion engine 2; a generator 11 that rotates by being driven by the internal combustion engine 2 to output alternating current (AC) power or rotates by receiving AC power to rotate the internal combustion engine 2; a power storage device 16 that serves as an electric power source in starting the internal combustion engine 2; an electric motor 15 that generates railway-vehicle motive power; and a drive control device 10 that controls various elements included in the railway vehicle driving apparatus 1.

Further, a start command signal S1 is supplied to the driving apparatus 1 from a starting switch arranged in a non-illustrated driver cab, and an operation command signal S2 is supplied to the driving apparatus 1 from a master controller arranged in the driver cab. The start command signal S1 is a signal that provides an instruction for starting of the internal combustion engine 2. The start command signal S1 is set at a low (L) level when the internal combustion engine 2 is to be stopped, and the start command signal S1 is set at a high (H) level when the internal combustion engine 2 is to be started. The operation command signal S2 is a signal that indicates one of a power running notch that provides instruction for an acceleration for a railway vehicle and a brake notch that provides instruction for a deceleration for the railway vehicle. The driving apparatus 1, when the start command signal S1 is set at the H level, starts the internal combustion engine 2. The internal combustion engine 2, after being started, is controlled by the internal-combustion-engine controller 3.

The internal combustion engine 2 includes a diesel engine, a gasoline engine, or the like. The internal combustion engine 2 includes an output shaft that is connected to an input shaft of the generator 11 and drives the generator 11 to generate electricity. Since the internal combustion engine 2 cannot perform self-starting, the generator 11 operates as an electric motor and rotates to start the internal combustion engine 2. The internal-combustion-engine controller 3, after the internal combustion engine 2 is started, controls the engine speed of the internal combustion engine 2.

The operation command signal S2 is supplied to the internal-combustion-engine controller 3. The internal-combustion-engine controller 3 calculates a target engine speed of the internal combustion engine 2 corresponding to the operation command signal S2 and controls the internal combustion engine 2 to bring an actual engine speed of the internal combustion engine 2 acquired from the speed sensor 4 close to the target engine speed.

The speed sensor 4 includes a pulse generator (PG) attached to the internal combustion engine 2 and outputs a signal indicating the engine speed of the internal combustion engine 2 obtained from a pulse signal output by the PG.

The generator 11 is connected to the internal combustion engine 2, is driven by the internal combustion engine 2 to generate AC power, and supplies the AC power to the drive control device 10. Further, the generator 11, when causing the internal combustion engine 2 to start, rotates by receiving AC power from the drive control device 10, thereby starting the internal combustion engine 2.

The electric motor 15 includes a three-phase induction motor and rotates by being driven by AC power output from a first inverter 14. The electric motor 15 is connected to an axle via, for example, a coupling, in order to transmit a torque to the axle.

The power storage device 16 includes a secondary battery having multiple battery cells and stores power for driving of the generator 11 to start the internal combustion engine 2.

The drive control device 10 controls (i) an operation of starting the internal combustion engine 2 by driving the generator 11 using the power stored in the power storage device 16 and (ii) an operation of, after the internal combustion engine 2 is started, using the power generated by the generator 11, rotating the electric motor 15 to generate the railway-vehicle motive power while storing power in the power storage device 16.

The drive control device 10 includes: a main converter 12 that converts AC power supplied to primary terminals thereof into direct current (DC) power and outputs the DC power from secondary terminals thereof, or converts DC power supplied to the secondary terminals into AC power and supplies the AC power to the generator 11; a first inverter 14 that converts the DC power output from the secondary terminals of the main converter 12 into AC power and outputs the AC power; a filter capacitor 13 for smoothening that is arranged in a circuit between the main converter 12 and the first inverter 14; a speed sensor 24 for obtaining a rotational speed of the electric motor 15; a step-down circuit 17 that steps down an output voltage of the main converter 12 and supplies power to the power storage device 16 with the stepped-down output voltage; a converter controller 18 that controls the power conversion performed by the main converter 12; an inverter controller 19 that controls the first inverter 14; and a step-down circuit controller 20 that controls the step-down circuit 17.

The primary terminals of the main converter 12 are connected to the generator 11, and the secondary terminals of the main converter 12 are connected to the first inverter 14. The main converter 12 operates in accordance with control by the converter controller 18. The main converter 12, when causing the internal combustion engine 2 to start, converts DC power that is supplied from the filter capacitor 13 charged with power supplied from the power storage device 16 to the secondary terminals into AC power, and supplies the AC power from the primary terminals to the generator 11 to rotate the generator 11. The rotation of the generator 11 causes rotation of the internal combustion engine 2, thereby starting the internal combustion engine 2. Further, the main converter 12, after the internal combustion engine 2 is started, in accordance with control by the converter controller 18, converts AC power supplied from the generator 11 to the primary terminals into DC power and supplies the DC power from the secondary terminals to the first inverter 14 and the power storage device 16.

The first inverter 14, in accordance with control by the inverter controller 19, converts the DC power output from the secondary terminals of the main converter 12 into AC power and outputs the AC power to the electric motor 15. The electric motor 15 rotates by being driven by the AC power output by the first inverter 14.

The speed sensor 24 includes a PG arranged in the electric motor 15 and outputs a signal indicating the rotational speed of the electric motor 15 that is obtained from a pulse signal output by the PG.

The step-down circuit 17 is arranged in a circuit between the secondary terminals of the main converter 12 and the power storage device 16, and when the output voltage of the main converter 12 is higher than a charging voltage of the power storage device 16, steps down the output voltage of the main converter 12 and applies the stepped-down voltage to the power storage device 16. The step-down circuit 17 includes contactors Q1, Q2, and Q3 that are connected in series, a voltage dividing resistor R1 connected in parallel to the contactor Q1, and a voltage dividing resistor R2 connected in parallel to the contactor Q2. The voltage dividing resistor R1 preferably has a resistance value that is sufficiently smaller than a resistance value of the voltage dividing resistor R2. Specifically, the resistance value of the voltage dividing resistor R1 is preferably several ohms (a), and the resistance value of the voltage dividing resistor R2 is preferably several hundred Q. The step-down circuit controller 20 controls conductivity/non-conductivity of the contactors Q1, Q2, and Q3. Different combinations of conductivity/non-conductivity of the contactors Q1, Q2, and Q3 result in different resistance values of the step-down circuit 17.

The start command signal S1 and the operation command signal S2 are supplied to the converter controller 18. The converter controller 18 operates in accordance with the start command signal S1 and the operation command signal S2 and controls on/off timings of multiple switching elements included in the main converter 12, thereby causing the main converter 12 to operate as a DC-AC converter to convert DC power supplied from the power storage device 16 into AC power, or as an AC-DC converter to convert the AC power supplied from the generator 11 into DC power. The converter controller 18 controls the on/off timings of the multiple switching elements included in the main converter 12 by sending switching control signals S3 to the multiple switching elements.

Specifically, when the start command signal S1 is set at the L level and the operation command signal S2 indicates a braking command, the converter controller 18 stops the main converter 12.

Further, when the start command signal S1 is set at the H level and a voltage of the filter capacitor 13 that is detected by a voltage detector 22 reaches a threshold voltage EFC1 suitable for starting of the internal combustion engine 2, the converter controller 18 controls the main converter 12 to cause the main converter 12 to convert DC power supplied from the power storage device 16 into AC power and to supply the AC power to the generator 11. In this case, the converter controller 18 calculates, based on a current detected by a current detector 21 and flowing from the main converter 12 to the generator 11, an actual torque of the generator 11 that operates as an electric motor. Then the converter controller 18 controls on/off operation of the multiple switching elements included in the main converter 12 such that the actual torque of the generator 11 approaches a target torque suitable for starting of the internal combustion engine 2. The converter controller 18 holds in advance the target torque suitable for starting of the internal combustion engine 2.

The converter controller 18, after causing the main converter 12 to start supplying of AC power to the generator 11 and then upon determination based on an output signal of the speed sensor 4 that the engine speed of the internal combustion engine 2 reaches a reference engine speed Th1 that enables independent rotation of the internal combustion engine 2, determines that the internal combustion engine 2 is started. The converter controller 18 holds in advance a value of the reference engine speed Th1. The current detector 21 connected to the primary terminals of the main converter 12 detects a phase current for each of a U-phase, V-phase and W-phase that flows through a circuit between the generator 11 and the main converter 12. The converter controller 18, after the internal combustion engine 2 is started, calculates an output voltage of the generator 11 based on (i) the engine speed of the internal combustion engine 2 that is acquired from the speed sensor 4 and (ii) the current values that are acquired from the current detector 21.

The converter controller 18, when the operation command signal S2 indicates a power running notch after the internal combustion engine 2 is started, controls on/off timings of the multiple switching elements included in the main converter 12 based on the output voltage of the generator 11 and a target voltage corresponding to the power running notch indicated by the operation command signal S2, in order to bring the output voltage of the main converter 12 close to the target voltage.

The operation command signal S2 is supplied to the inverter controller 19. The inverter controller 19 calculates a target torque of the electric motor 15 based on (i) the power running notch indicated by the operation command signal S2 and (ii) the rotational speed of the electric motor 15 that is acquired from the speed sensor 24. Further, the inverter controller 19 calculates an actual torque of the electric motor 15 based on current values acquired from a current detector 23. The current detector 23 detects a phase current for each of U-phase, V-phase and W-phase that flows from the first inverter 14 to the electric motor 15. The inverter controller 19, in order to bring the actual torque of the electric motor 15 close to the target torque, controls multiple switching elements included in the first inverter 14. The inverter controller 19 controls on/off timings of the multiple switching elements included in the first inverter 14 by sending switching control signals S4 to the multiple switching elements.

The step-down circuit controller 20, as described later, opens and closes the contactors Q1, Q2, and Q3 based on the start command signal S1, the engine speed of the internal combustion engine 2 that is acquired from the speed sensor 4, and a voltage value acquired from the voltage detector 22, thereby changing a resistance value of a circuit between the secondary terminals of the main converter 12 and the power storage device 16.

Next, an operation of the driving apparatus 1 having the above-described configuration is described with reference to the timing chart illustrated in FIG. 2.

Figure 2:
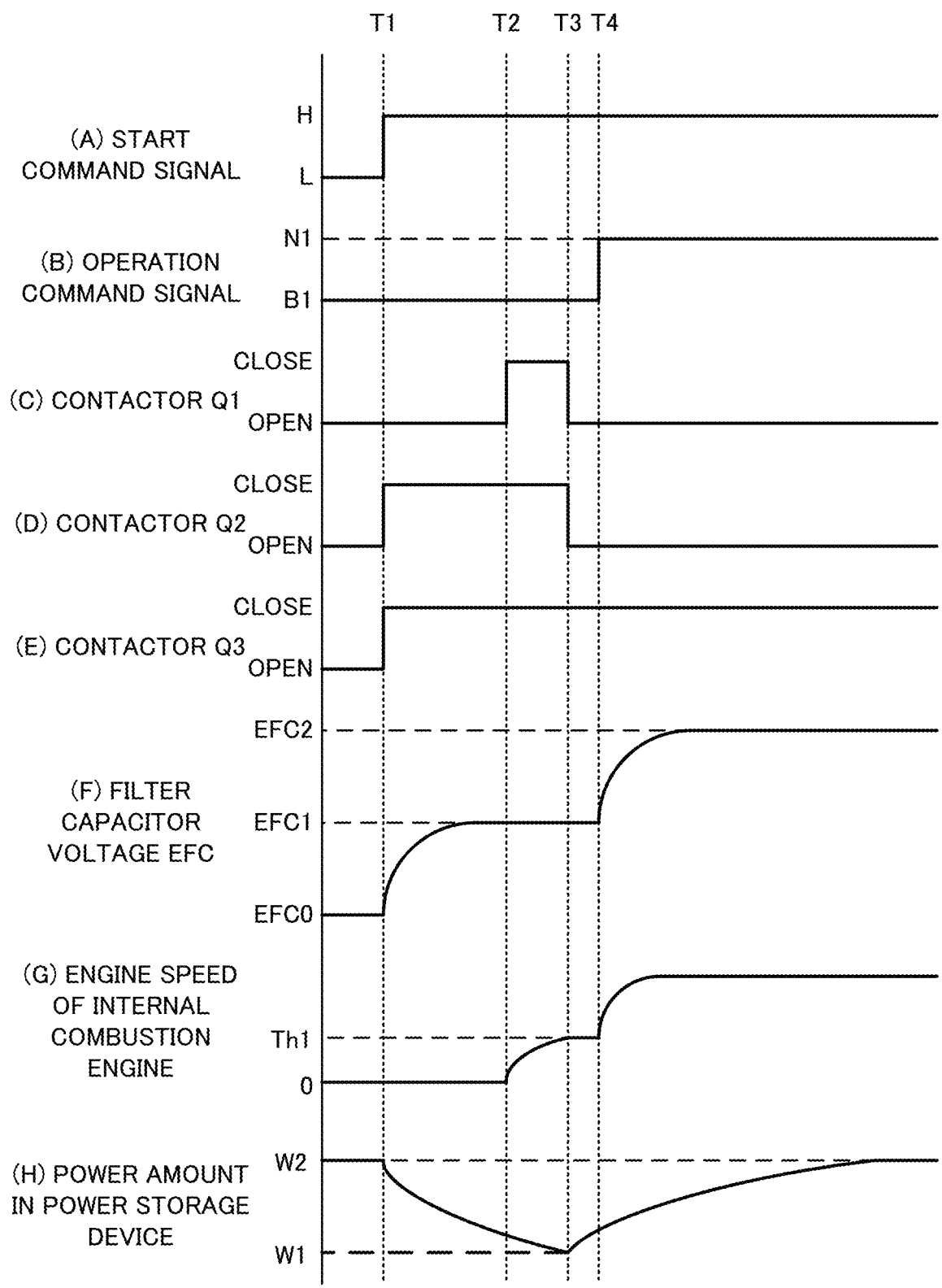
FIG. 2 is a timing chart illustrating an operation of processing of starting an internal combustion engine that is performed by the railway vehicle driving apparatus according to Embodiment 1.

During a period in which the railway vehicle is stopped, the start command signal S1 is at the L level and the operation command signal S2 indicates a brake notch B1, as illustrated in (A) and (B) of FIG. 2. Hereinafter, a timing at which the start command signal S1 changes from the L level to the H level is referred to as the "time T1".

Figure 3:
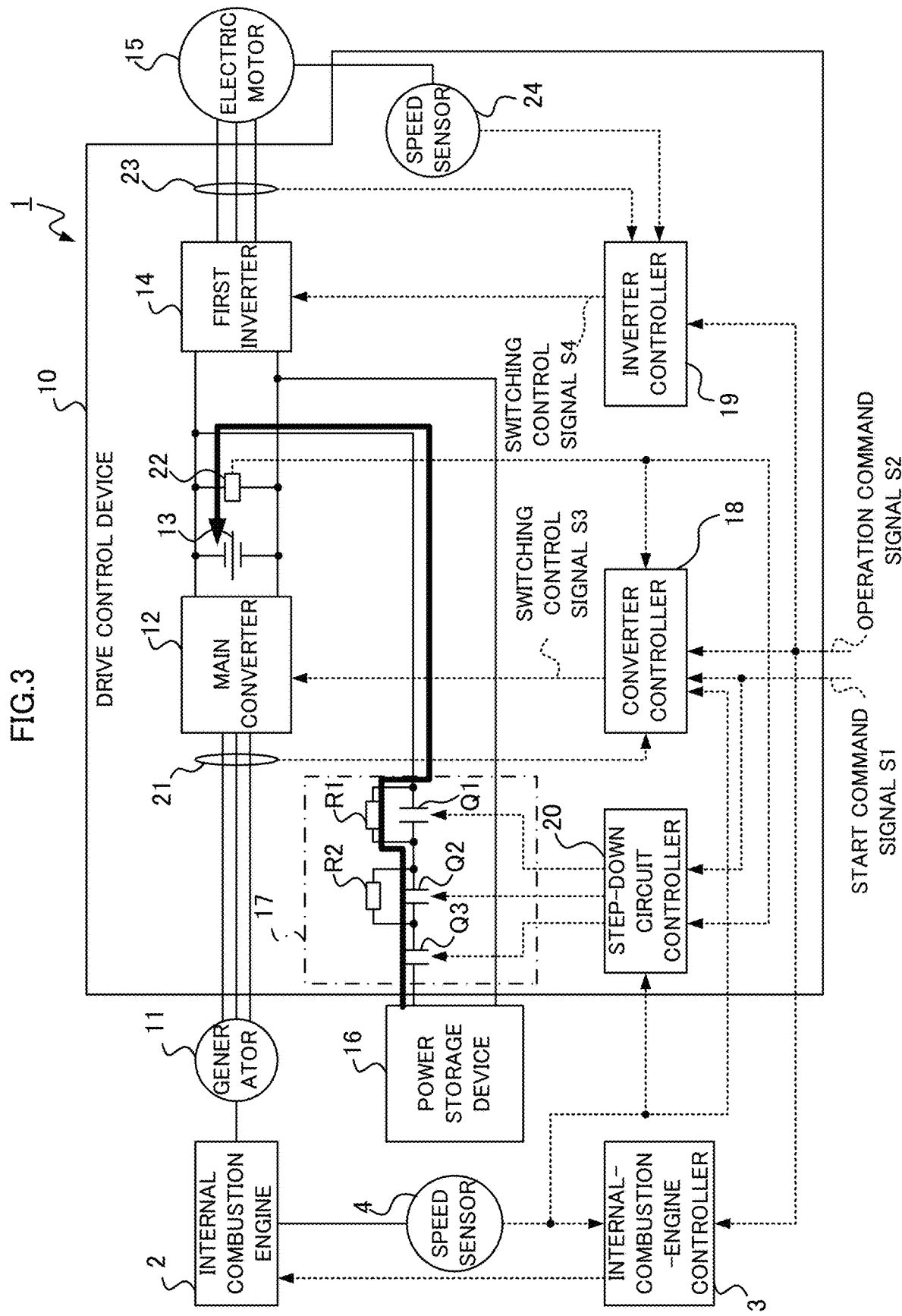
FIG. 3 illustrates an example flow of an electric current in the railway vehicle driving apparatus according to Embodiment 1.

As illustrated in (C), (D), and (E) of FIG. 2, the step-down circuit controller 20, in response to the start command signal S1 and the operation command signal S2, keeps all of the contactors Q1, Q2, and Q3 open until the time T1. Then in response to a change at the time T1 in the start command signal S1 from the L level to the H level, the step-down circuit controller 20, while keeping the contactor Q1 open, closes the contactors Q2 and Q3 to charge the filter capacitor 13 using the power storage device 16 as an electric power source. Upon closing of the contactors Q2 and Q3, current flows from the power storage device 16 to the filter capacitor 13 through the contactors Q3 and Q2 and the voltage dividing resistor R1, as illustrated in FIG. 3 using a solid arrow. The flow of current to the filter capacitor 13 via the voltage dividing resistor R1 prevents an inrush current from flowing to the filter capacitor 13.

As current flows from the power storage device 16 to the filler capacitor 13, an amount of power stored in the secondary battery included in the power storage device 16 gradually decreases from a maximum power amount W2 as illustrated in (H) of FIG. 2, and a both-ends voltage that is a voltage between both ends of the filter capacitor 13 gradually increases from a voltage EFC0 as illustrated in (F) of FIG. 2.

The step-down circuit controller 20 monitors the both-ends voltage of the filter capacitor 13 using an output signal from the voltage detector 22 and detects, at a time T2, reach of the both-ends voltage EFC to the threshold voltage EFC1. Then the step-down circuit controller 20 closes the contactor Q1 as illustrated in (C) of FIG. 2, in order to start the internal combustion engine 2 using the power storage device 16 as an electric power source.

Figure 4:
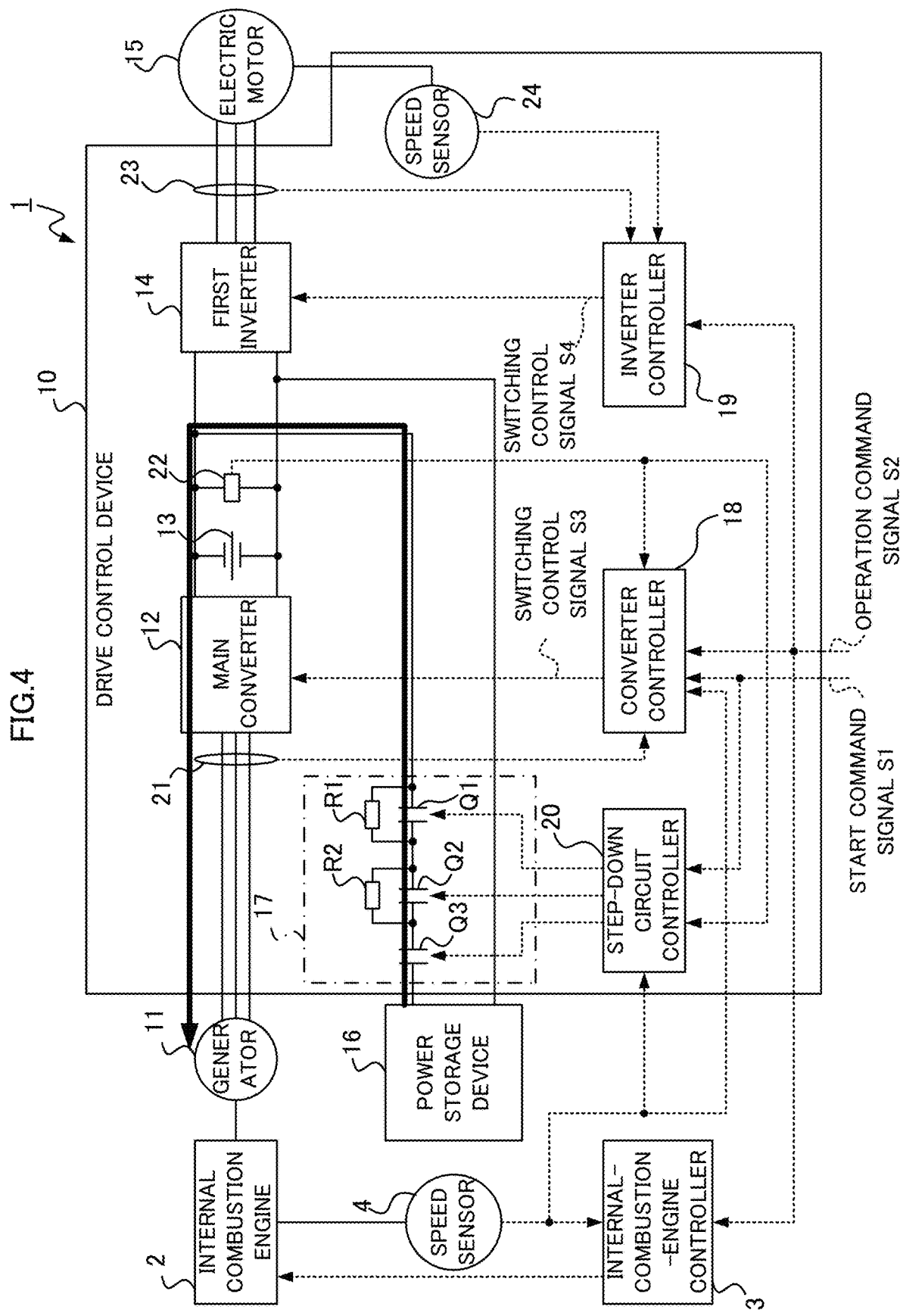
FIG. 4 illustrates an example flow of an electric current in the railway vehicle driving apparatus according to Embodiment 1.

The converter controller 18, in response to (i) the start command signal S1 at the H level, (ii) the operation command signal S2 indicating the brake notch B1, and (iii) the output signal from the voltage detector 22 indicating that the both-ends voltage EFC of the filter capacitor 13 reaches the threshold voltage EFC1, starts controlling on/off operation of the multiple switching elements included in the main converter 12, thereby causing the main converter 12 to convert DC power supplied from the power storage device 16 into AC power and to supply the AC power to the generator 11. This leads to flowing of current from the power storage device 16 to the main converter 12 through the contactors Q3, Q2, and Q1, as illustrated in FIG. 4 using a solid arrow.

More specifically, the converter controller 18, based on the current flowing from the main converter 12 to the generator 11 and detected by the current detector 21, calculates the actual torque of the generator 11 that operates as an electric motor. Then the converter controller 18 controls on/off timings of the multiple switching elements included in the main converter 12, in order to bring the actual torque close to the target torque suitable for starting of the internal combustion engine 2. The target torque suitable for starting of the internal combustion engine 2 is determined based on characteristics of the internal combustion engine 2. The converter controller 18 performs the above-described control, thereby causing the main converter 12 to convert DC power supplied from the power storage device 16 to the secondary terminals into AC power and to supply the AC power from the primary terminals to the generator 11. This allows the generator 11 to operate as an electric motor and to rotate the internal combustion engine 2 and thus causes, as illustrated in (G) of FIG. 2, gradual increase in the engine speed of the internal combustion engine 2 on and after the time T2.

A timing at which the engine speed of the internal combustion engine 2 reaches the reference engine speed Th1 that enables independent rotation of the internal combustion engine 2 is referred to as a "time T3". In other words, the internal combustion engine 2 is started and starts independent rotation at the time T3.

The converter controller 18, when detecting based on the output signal from the speed sensor 4 that the engine speed of the internal combustion engine 2 reaches the reference engine speed Th1, controls on/off operation of the multiple switching elements included in the main converter 12, thereby causing the main converter 12 to convert AC power that the generator 11 driven by the internal combustion engine 2 supplies to the primary terminals into DC power and to output the DC power from the secondary terminals. As illustrated in (F) of FIG. 2, the converter controller 18 controls conduction ratios of the multiple switching elements included in the main converter 12 such that the main converter 12 outputs the DC power with the threshold voltage EFC1.

The step-down circuit controller 20, when detecting based on the output signal from the speed sensor 4 that the engine speed of the internal combustion engine 2 reaches the reference engine speed Th1, opens the contactors Q1 and Q2 while keeping the contactor Q3 closed, as illustrated in (C), (D), and (E) of FIG. 2, in order to, on and after a time T4 described later, (i) step down, using the step-down circuit 17, the voltage that is output by the main converter 12 from the secondary terminals and is higher than a voltage suitable for charging of the power storage device 16 and (ii) supply power to the power storage device 16 with the stepped-down voltage.

Thereafter, the power running notch is input from the master controller, and thus the operation command signal S2 indicates a power running notch N1. This timing is referred to as a time T4. On and after the time T4, the internal-combustion-engine controller 3 controls the internal combustion engine 2 to bring the engine speed of the internal combustion engine 2 close to an engine speed corresponding to the power running notch N1, thereby increasing the engine speed of the internal combustion engine 2 as illustrated in (G) of FIG. 2. In accordance with the increase in the engine speed of the internal combustion engine 2, a rotational speed of the generator 11 and the output voltage of the generator 11 increase.

Then the converter controller 18, in response to the operation command signal S2 indicating the power running notch N1, starts performing on/off control operation for the multiple switching elements included in the main converter 12, in order to bring the output voltage of the main converter 12 close to a fixed voltage corresponding to the power running notch N1, for example, to 600V. Specifically, the converter controller 18 calculates the output voltage of the of the generator 11 based on (i) the engine speed of the internal combustion engine 2 that is acquired from the speed sensor 4 and (ii) the current values that are acquired from the current detector 21. Then the converter controller 18, based on the output voltage of the generator 11 and a target voltage corresponding to the power running notch indicated by the operation command signal S2, controls the conduction ratios of the multiple switching elements included in the main converter 12, in order to bring the output voltage of the main converter 12 close to the target voltage.

Figure 5:
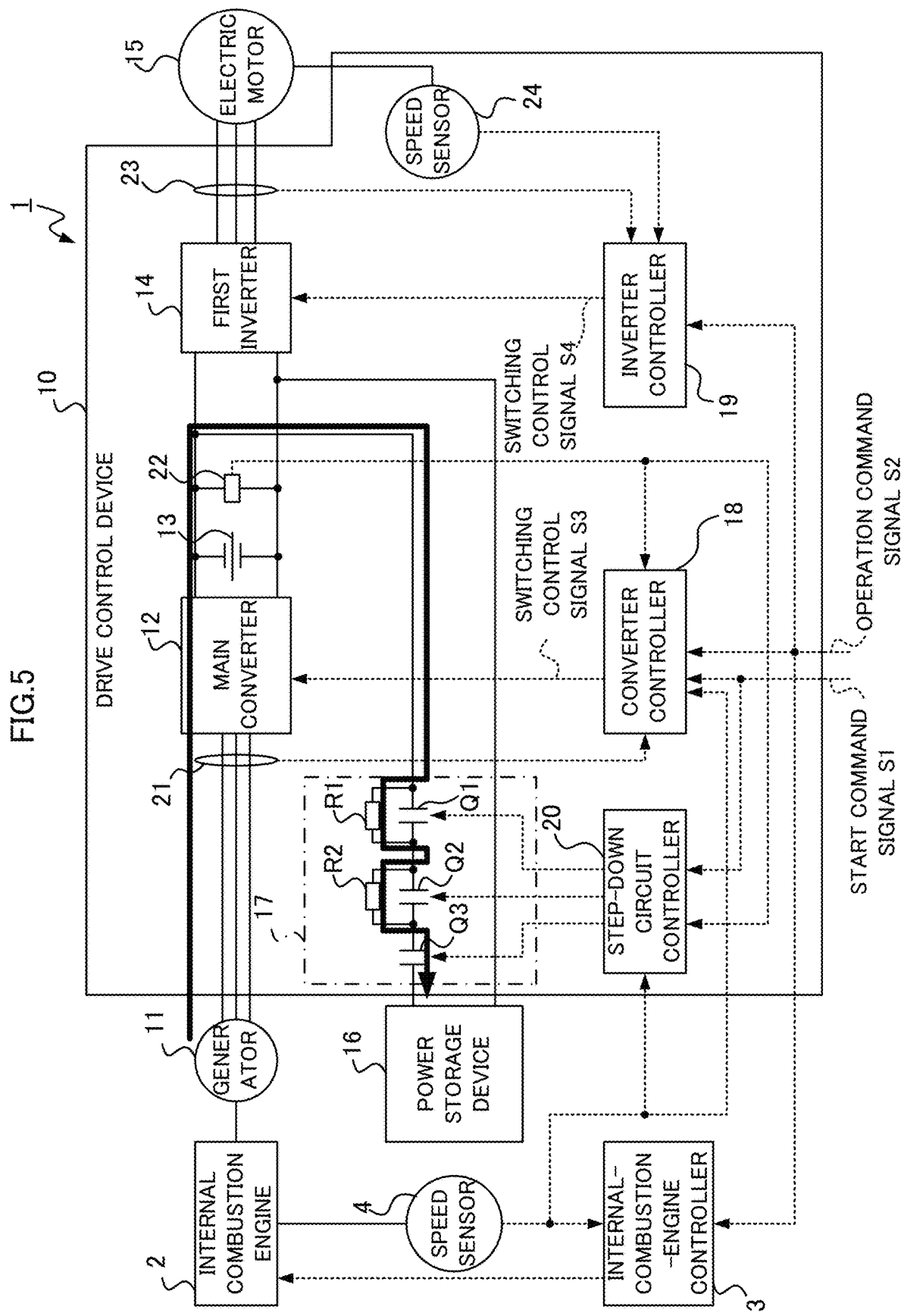
FIG. 5 illustrates an example flow of an electric current in the railway vehicle driving apparatus according to Embodiment 1.

As illustrated in (G) of FIG. 2, the output voltage of the main converter 12, that is, the voltage of the filter capacitor 13, increases on and after the time T4. As a result, current flows from the main converter 12 to the power storage device 16 through the voltage dividing resistors R1 and R2 and the contactor Q3 to charge the power storage device 16, as illustrated in FIG. 5 using a solid arrow. Thus, on and after the time T4, the amount of power stored in the power storage device 16 gradually increases from a power amount W1 to the maximum power amount W2. The flow of current through the voltage dividing resistors R1 and R2 leads to applying of a voltage to the power storage device 16 at, for example, about 300V. In other words, the step-down circuit 17 steps down the voltage that is output by the main converter 12 and is higher than the voltage suitable for charging of the power storage device 16, and the power storage device 16 is charged with the voltage suitable for charging of the power storage device 16.

Furthermore, the inverter controller 19 calculates the target torque of the electric motor 15 based on the power running notch N1 and the rotational speed of the electric motor 15 that is acquired from the speed sensor 24. Further, the inverter controller 19 calculates the actual torque of the electric motor 15 based on current values that are detected for the currents flowing in the phases of the electric motor 15 and are acquired from the current detector 23. Further, the inverter controller 19, in order to bring the actual torque close to the target torque, controls on/off operation of the multiple switching elements included in the first inverter 14. Thus, the electric motor 15 is driven in response to the operation command signal S2 on and after the time T4, to generate the railway-vehicle motive power. This enables running of the railway vehicle while charging the power storage device 16.

As described above, the drive control device 10 according to Embodiment 1 enables, while charging the power storage device 16 after the internal combustion engine 2 is started, driving of the electric motor 15.

Embodiment 2

Figure 6:
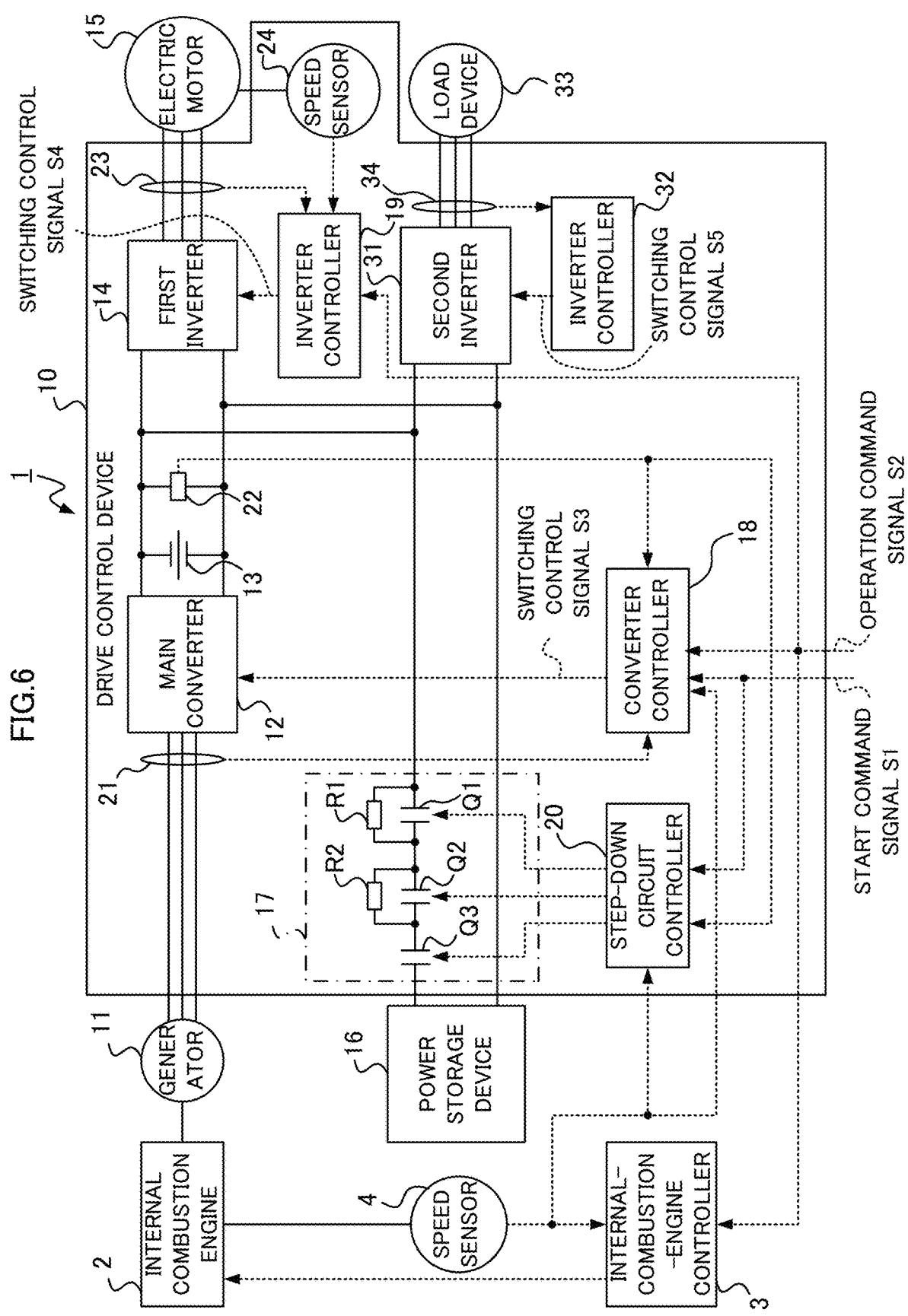
FIG. 6 is a block diagram illustrating configuration of a railway vehicle driving apparatus according to Embodiment 2 of the present disclosure.

In Embodiment 1, the first inverter 14 that drives the electric motor 15 is connected to the secondary terminals of the main converter 12. However, a device other than the electric motor 15 that is to be supplied power may be supplied power by connecting another inverter to the secondary terminals of the main converter 12 and supplying power from the other inverter to the device. As illustrated in the example of FIG. 6, a drive control device 10 according to Embodiment 2 includes, in addition to the elements included in the drive control device 10 according to Embodiment 1, a second inverter 31 connected to the secondary terminals of the main converter 12 and an inverter controller 32 that controls the second inverter 31. The second inverter 31 converts DC power supplied from the main converter 12 to primary terminals thereof into AC power and supplies, from secondary terminals thereof, the AC power to a load device 33 installed in the railway vehicle. The load device 33 may be any electronic devices installed in the railway vehicle, such as an air conditioner, a lightning device, and a blower. The inverter controller 32 controls on/off operation of multiple switching elements included in the second inverter 31. An output voltage of the second inverter 31 may be a value different from that of the output voltage of the secondary terminals of the first inverter 14.

The inverter controller 32 calculates output power of the second inverter 31 based on current values acquired from a current detector 34. Then the inverter controller 32 controls on/off operation of the multiple switching elements included in the second inverter 31, in order to bring the output power of the second inverter 31 close to a target voltage suitable for power consumption by the load device 33. The inverter controller 32 controls on/off timings of the multiple switching elements included in the second inverter 31 by sending switching control signals S5 to the multiple switching elements. The current detector 34 detects a phase current for each of the U-phase, V-phase and W-phase that flows from the second inverter 31 to the load device 33.

The contactors Q1, Q2, and Q3 are closed and opened at timings similar to those in Embodiment 1. The converter controller 18, by performing control similar to that in Embodiment 1, causes the first inverter 14 to drive the electric motor 15 and causes the second inverter 31 to run the load device 33, after the internal combustion engine 2 is started and during charging of the power storage device 16.

As described above, the drive control device 10 according to Embodiment 2 enables, while charging the power storage device 16 after the internal combustion engine 2 is started, driving of the electric motor 15 and running of the load device 33.

Embodiment 3

Figure 7:
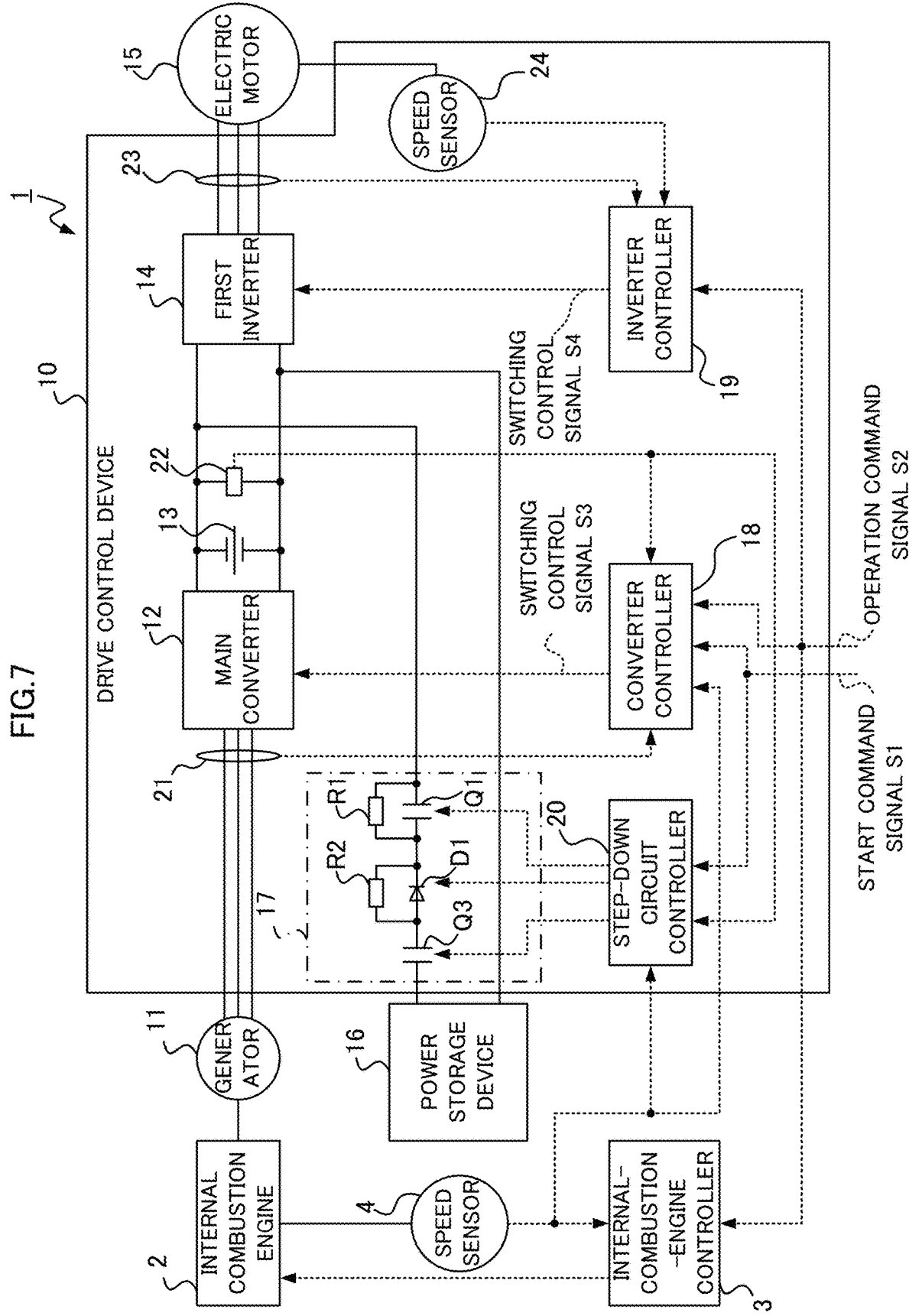
FIG. 7 is a block diagram illustrating configuration of a railway vehicle driving apparatus according to Embodiment 3 of the present disclosure.

The step-down circuit 17 may include any circuit that can step down the voltage of the DC power output by the main converter 12 and can supply the stepped-down DC power to the power storage device 16. As illustrated in the example of FIG. 7, the step-down circuit 17 included in a driving apparatus 1 according to Embodiment 3 includes a diode D1 as a substitute for the contactor Q2 of the step-down circuits 17 included in the driving apparatuses 1 according to Embodiment 1 and 2. The anode of the diode D1 is connected to the power storage device 16 via the contactor Q3. The cathode of the diode D1 is connected to the secondary terminals of the main converter 12 via the contactor Q1. The voltage dividing resistor R2 is connected in parallel to the diode D1.

The contactors Q1 and Q3 are closed and opened at timings similar to those in Embodiment 1. Upon closing of the contactor Q3 in response to the start command signal S1 at the H level, current flows from the power storage device 16 to the main converter 12 through the contactor Q3, the diode D1, and the voltage dividing resistor R1. Further, upon closing of the contactor Q1 in response to the output signal from the voltage detector 22 indicating that the both-ends voltage EFC of the filter capacitor 13 reaches the threshold voltage EFC1, current flows from the power storage device 16 to the main converter 12 through the contactor Q3, the diode D1, and the contactor Q1. Then, after the internal combustion engine 2 is started and the contactor Q1 is opened, current flows from the main converter 12 to the power storage device 16 through the voltage dividing resistors R1 and R2 and the contactor Q3, thereby charging the power storage device 16. The converter controller 18, by performing control similar to that in Embodiment 1, causes the first inverter 14 to drive the electric motor 15, after the internal combustion engine 2 is started and during charging of the power storage device 16.

As described above, the drive control device 10 according to Embodiment 3 enables driving by the first inverter 14 of the electric motor 15 while achieving power supply to the power storage device 16 with a stepped-down voltage that is obtained by stepping down the voltage of the DC power output by the main converter 12 using the step-down circuit 17 having simple configuration by inclusion of the diode D1 and the voltage dividing resistor R2. That is to say, running of the railway vehicle can be achieved after the internal combustion engine 2 is started and during charging of the power storage device 16. Employment of the diode D1 as a substitute for the contactor Q2 enables simplification in configuration of the step-down circuit 17.

Embodiment 4

Figure 8:
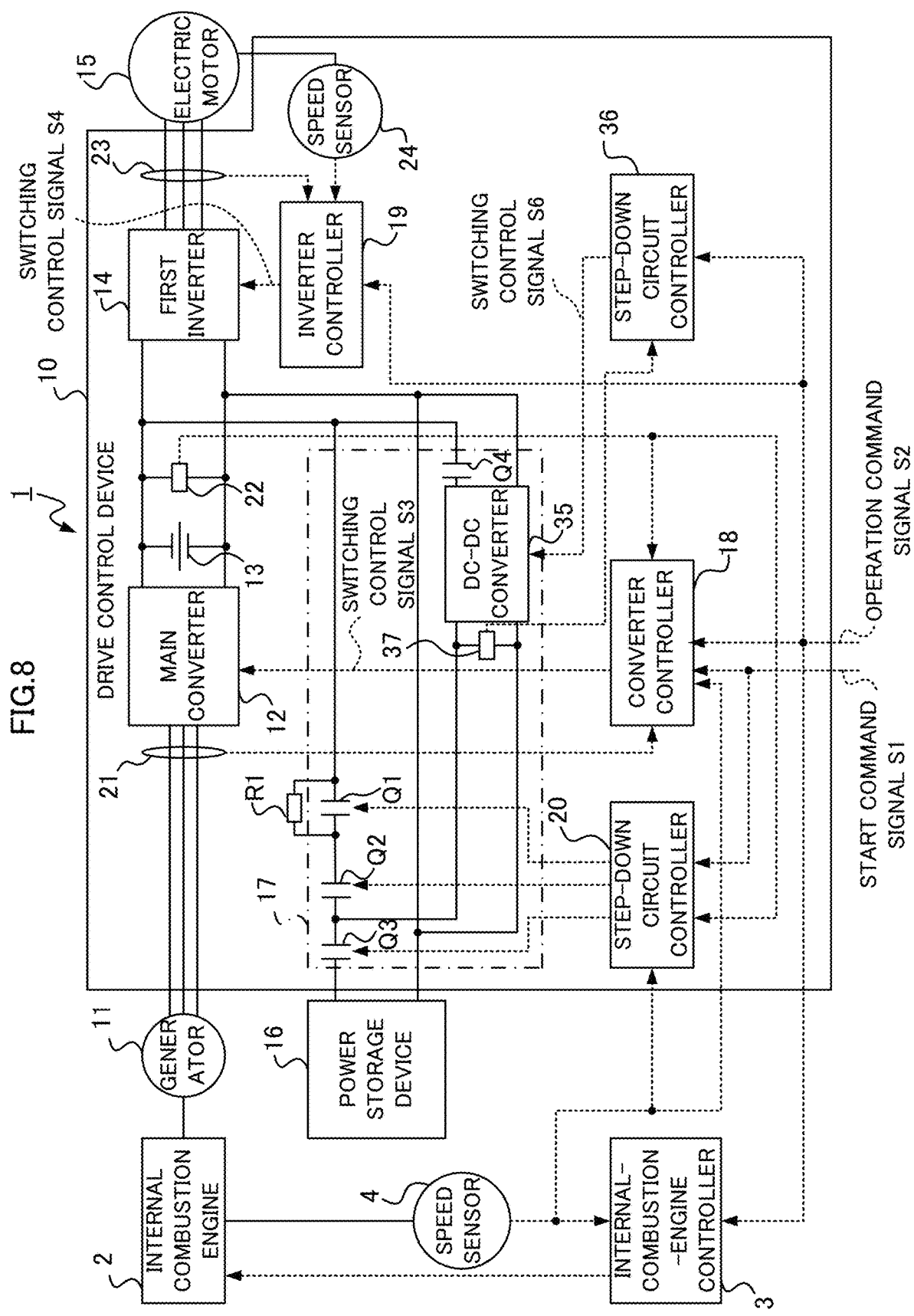
FIG. 8 is a block diagram illustrating configuration of a railway vehicle driving apparatus according to Embodiment 4 of the present disclosure.

The step-down circuit 17 may include any circuits that can step down the voltage of the DC power output by the main converter 12 and can supply the stepped-down DC power to the power storage device 16. As illustrated in the example of FIG. 8, the step-down circuit 17 included in a driving apparatus 1 according to Embodiment 4 does not include the voltage dividing resistor R2 included in the step-down circuits 17 according to Embodiments 1 and 2 and includes a contactor Q4 and a DC-DC converter 35. The drive control device 10 further includes a step-down circuit controller 36 that controls power conversion performed by the DC-DC converter 35. Specifically, the step-down circuit controller 36 controls multiple switching elements included in the DC-DC converter 35. The step-down circuit controller 36, after the internal combustion engine 2 is started, controls on/off operation of the multiple switching elements included in the DC-DC converter 35 to bring the output voltage of the DC-DC converter 35 that is acquired from a voltage detector 37 close to the target voltage suitable for charging of the power storage device 16, in response to the operation command signal S2 indicating the power running notch. The step-down circuit controller 36 controls the on/off operation of the multiple switching elements included in the DC-DC converter 35 by sending switching control signals S6 to the multiple switching elements. The step-down circuit controller 36 controls the on/off operation of the multiple switching elements included in the DC-DC converter 35 as described above, thereby causing the DC-DC converter 35 to step down the voltage of the DC power output by the main converter 12 and to supply the stepped-down DC power to the power storage device 16.

An operation of the driving apparatus 1 having the above-described configuration is described with reference to the timing chart illustrated in FIG. 9. Similarly to Embodiment 1, during a period in which the railway vehicle is stopped, the start command signal S1 is at the L level and the operation command signal S2 indicates the brake notch B1, as illustrated in (A) and (B) of FIG. 9. Hereinafter, a timing at which the start command signal S1 changes from the L level to the H level is referred to as the "time T1".

Figure 9:
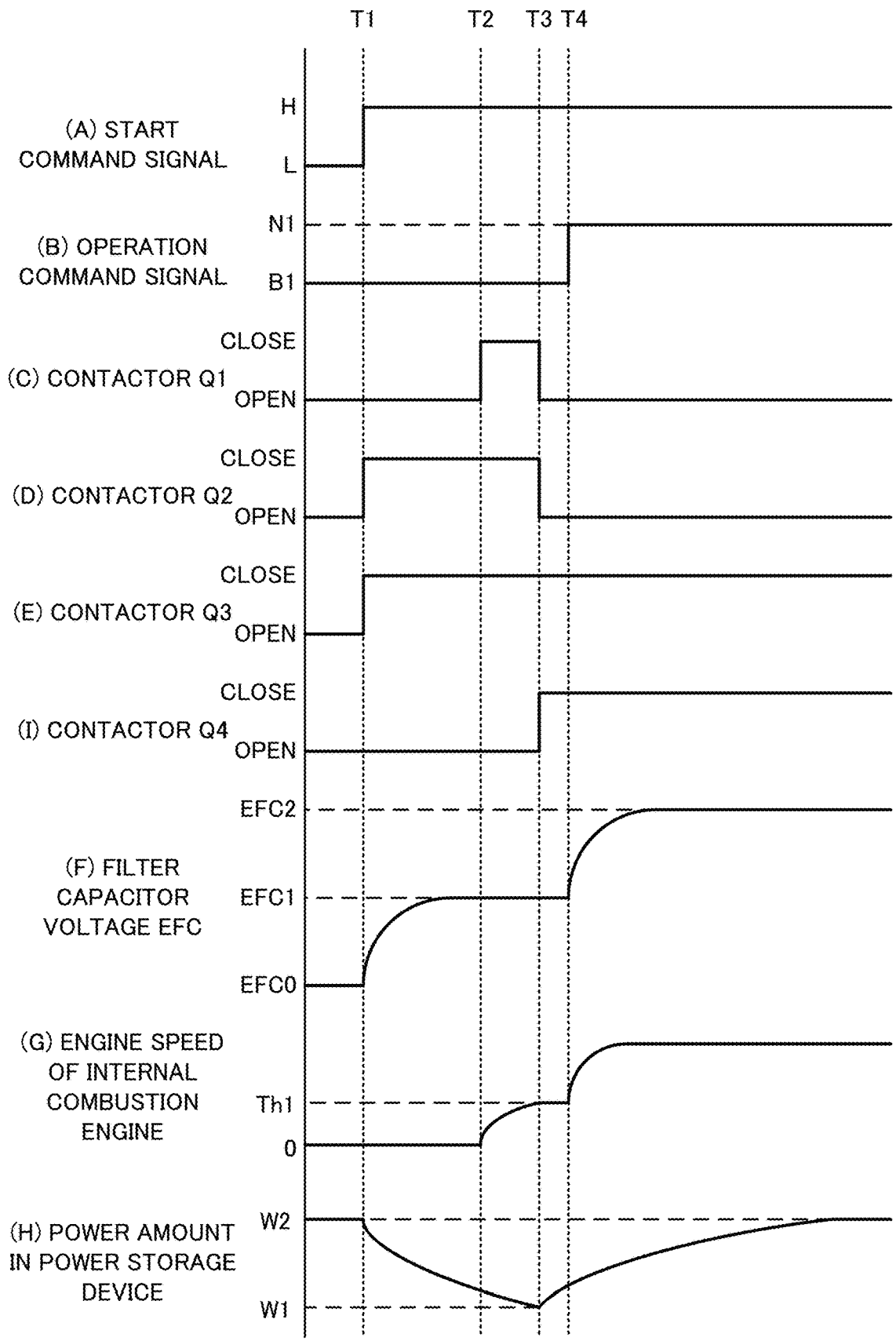
FIG. 9 is a timing chart illustrating an operation of processing of starting an internal combustion engine that is performed by the railway vehicle driving apparatus according to Embodiment 4.
Figure 10:
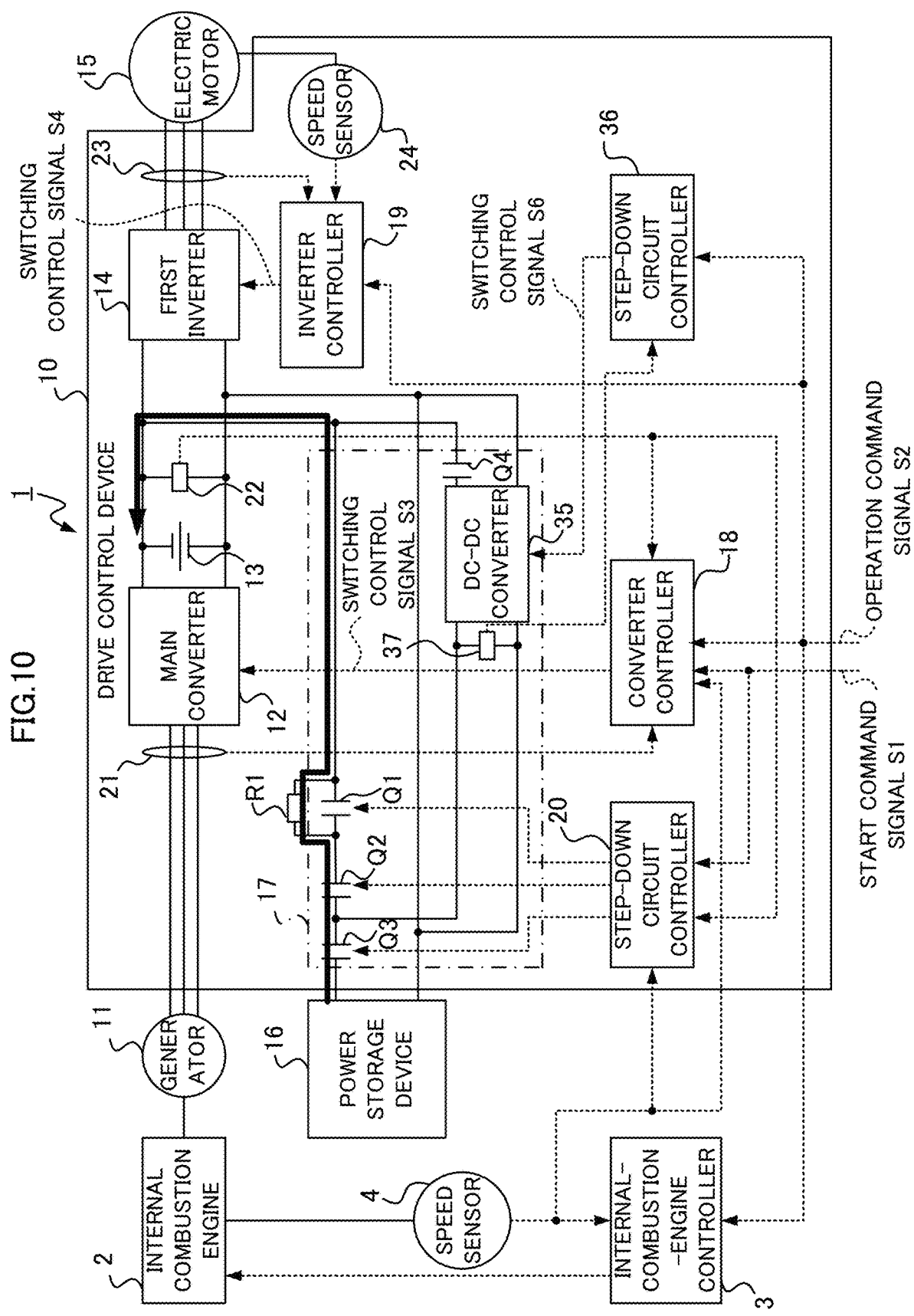
FIG. 10 illustrates an example flow of an electric current in the railway vehicle driving apparatus according to Embodiment 4.

As illustrated in (C), (D), (E), and (I) of FIG. 9, the step-down circuit controller 20, in response to the start command signal S1 and the operation command signal S2, keeps all of the contactors Q1, Q2, Q3, and Q4 open until the time T1. Then in response to a change at the time T1 in the start command signal S1 from the L level to the H level, the step-down circuit controller 20, while keeping the contactors Q1 and Q4 open, closes the contactors Q2 and Q3 to charge the filter capacitor 13 using the power storage device 16 as an electric power source. Upon closing of the contactors Q2 and Q3, current flows from the power storage device 16 to the filter capacitor 13 through the contactors Q3 and Q2 and the voltage dividing resistor R1, as illustrated in FIG. 10 using a solid arrow. Flow of current to the filter capacitor 13 via the voltage dividing resistor R1 prevents an inrush current from flowing to the filter capacitor 13.

As current flows from the power storage device 16 to the filler capacitor 13, the amount of power stored in the secondary battery included in the power storage device 16 gradually decreases from a maximum power amount W2 as illustrated in (H) of FIG. 9, and the both-ends voltage of the filter capacitor 13 gradually increases from a voltage EFC0 as illustrated in (F) of FIG. 9.

The step-down circuit controller 20 monitors the both-ends voltage of the filter capacitor 13 using the output signal from the voltage detector 22 and detects, at a time T2, reach of the both-ends voltage EFC to the threshold voltage EFC1. Then the step-down circuit controller 20 closes the contactor Q1 while keeping the contactor Q4 open as illustrated in (C) of FIG. 9, in order to start the internal combustion engine 2 using the power storage device 16 as an electric power source.

Figure 11:
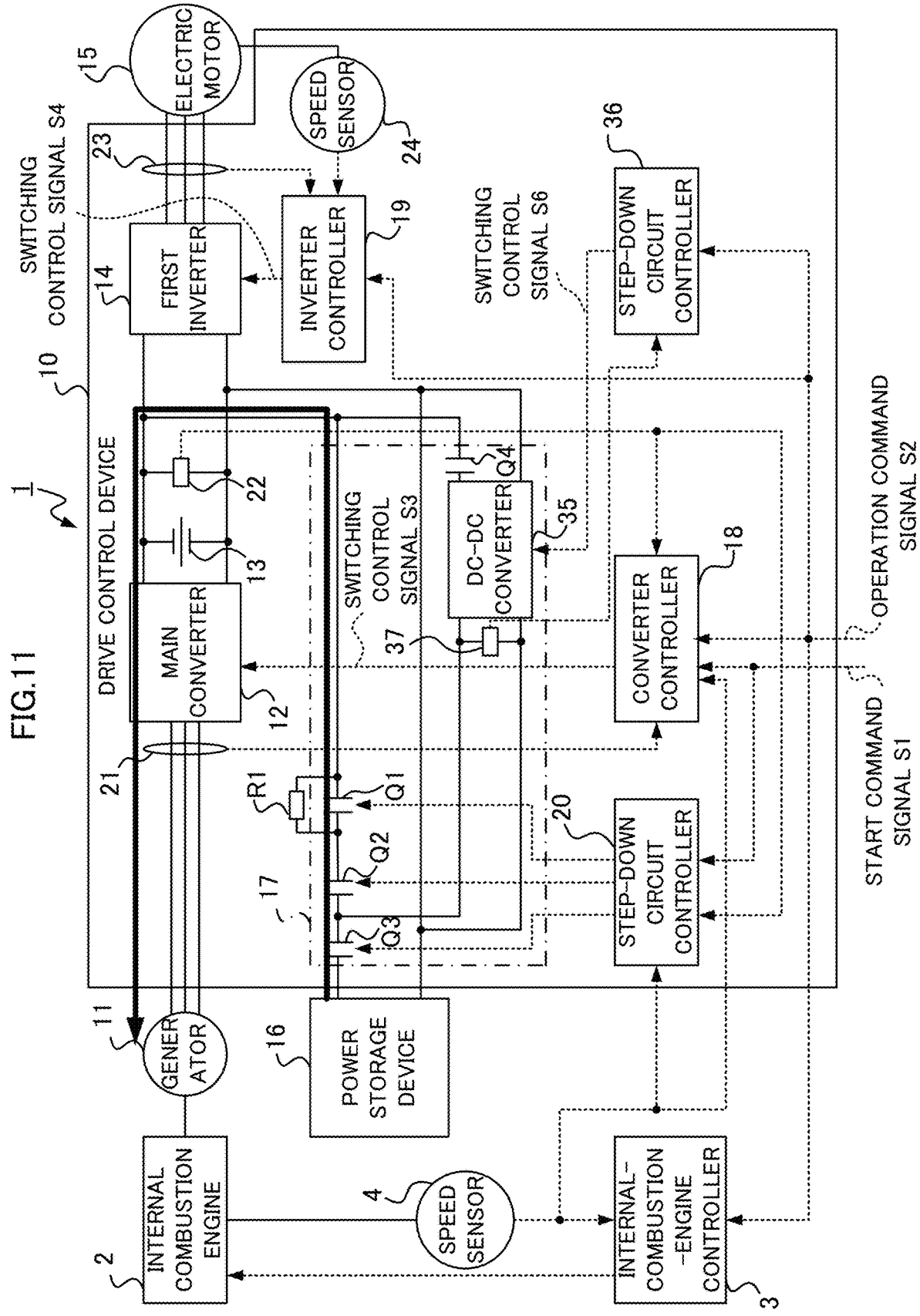
FIG. 11 illustrates an example flow of an electric current in the railway vehicle driving apparatus according to Embodiment 4.

Similarly to Embodiment 1, the converter controller 18, in response to (i) the start command signal S1 at the H level, (ii) the operation command signal S2 indicating the brake notch B1, and (iii) the output signal from the voltage detector 22 indicating that the both-ends voltage EFC of the filter capacitor 13 reaches the threshold voltage EFC1, starts controlling on/off operation of the multiple switching elements included in the main converter 12, thereby causing the main converter 12 to convert DC power supplied from the power storage device 16 into AC power and to supply the AC power to the generator 11. This leads to flow of current from the power storage device 16 to the main converter 12 through the contactors Q3, Q2, and Q1, as illustrated in FIG. 11 using a solid arrow.

The converter controller 18 performs the above-described control, thereby causing the main converter 12 to convert DC power supplied from the power storage device 16 to the secondary terminals into AC power and to supply the AC power from the primary terminals to the generator 11. This allows the generator 11 to operate as an electric motor and to rotate the internal combustion engine 2 and thus causes, as illustrated in (G) of FIG. 9, gradual increase in the engine speed of the internal combustion engine 2 on and after the time T2.

A timing at which the engine speed of the internal combustion engine 2 reaches the reference engine speed Th1 is referred to as a "time T3". In other words, the internal combustion engine 2 is started and starts independent rotation at the time T3.

The converter controller 18, when detecting based on the output signal from the speed sensor 4 that the engine speed of the internal combustion engine 2 reaches the reference engine speed Th1, controls on/off operation of the multiple switching elements included in the main converter 12, thereby causing the main converter 12 to convert AC power that the generator 11 driven by the internal combustion engine 2 supplies to the primary terminals into DC power and to output the DC power from the secondary terminals. As illustrated in (F) of FIG. 9, the converter controller 18 controls conduction ratios of the multiple switching elements included in the main converter 12 such that the main converter 12 outputs the DC power with the threshold voltage EFC1.

The step-down circuit controller 20, when detecting based on the output signal from the speed sensor 4 that the engine speed of the internal combustion engine 2 reaches the reference engine speed Th1, opens the contactors Q1 and Q2 and closes the contactor Q4 while keeping the contactor Q3 closed, as illustrated in (C), (D), (E), and (I) of FIG. 9, in order to, on and after a time T4 described later, (i) step down, using the step-down circuit 17, the voltage that is output by the main converter 12 from the secondary terminals and is higher than a voltage suitable for charging of the power storage device 16 and (ii) supply power to the power storage device 16 with the stepped-down voltage. The step-down circuit controller 36 controls on/off operation of the switching elements included in the DC-DC converter 35, thereby charging the power storage device 16 with the output voltage of the DC-DC converter 35.

Thereafter, the power running notch is input from the master controller, and thus the operation command signal S2 indicates the power running notch N1. This timing is referred to as a time T4. On and after the time T4, the internal-combustion-engine controller 3 controls the internal combustion engine 2 to bring the engine speed of the internal combustion engine 2 close to an engine speed corresponding to the power running notch N1, thereby increasing the engine speed of the internal combustion engine 2 as illustrated in (G) of FIG. 9. In accordance with the increase in the engine speed of the internal combustion engine 2, a rotational speed of the generator 11 and the output voltage of the generator 11 increase.

Then the converter controller 18, in response to the operation command signal S2 indicating the power running notch N1, starts performing on/off control operation for the multiple switching elements included in the main converter 12, in order to bring the output voltage of the main converter 12 close to a fixed voltage corresponding to the power running notch N1.

The step-down circuit controller 36, on and after the time T4, controls on/off operation of the multiple switching elements included in the DC-DC converter 35. As a result, the DC-DC converter 35 steps down the voltage of the DC power output by the main converter 12 and supplies the stepped-down DC power to the power storage device 16. Then the step-down circuit controller 36 controls conduction ratios of the multiple switching elements included in the DC-DC converter 35, in order to bring the output voltage of the DC-DC converter 35 acquired from the voltage detector 37 close to the target voltage suitable for charging of the power storage device 16.

Figure 12:
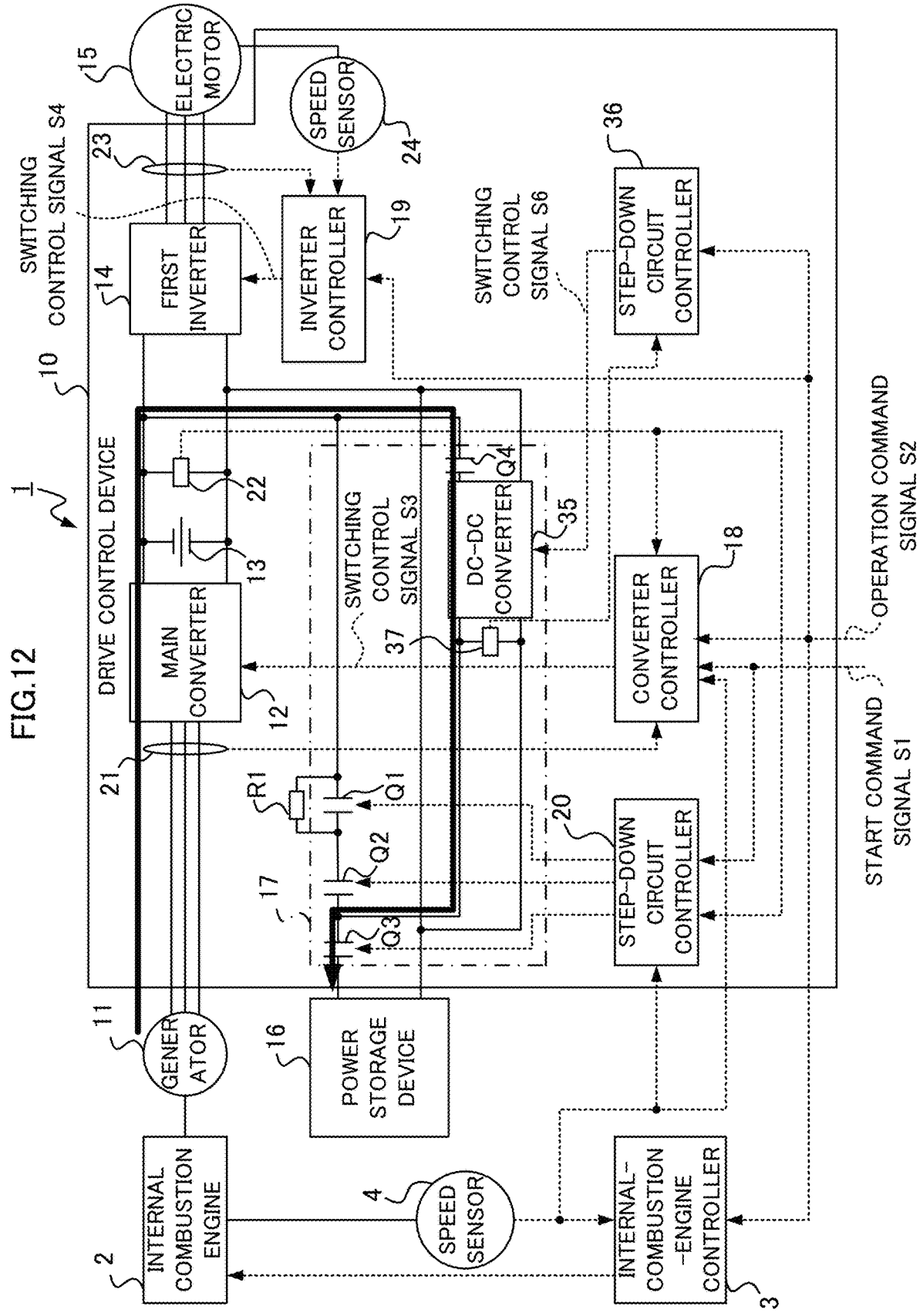
FIG. 12 illustrates an example flow of an electric current in the railway vehicle driving apparatus according to Embodiment 4.

On and after the time T4, the output voltage of the main converter 12 that is, the voltage of the filter capacitor 13, increases as illustrated in (G) of FIG. 9, and the step-down circuit controller 36 controls the multiple switching elements included in the DC-DC converter 35. As a result, current flows from the main converter 12 to the power storage device 16 through the contactor Q4, the DC-DC converter 35, and the contactor Q3 to charge the power storage device 16, as illustrated in FIG. 12 using a solid arrow. Thus, on and after the time T4, the amount of power stored in the power storage device 16 gradually increases from a power amount W1 to the maximum power amount W2. Processing by the DC-DC converter 35 leads to applying of a voltage to the power storage device 16 at, for example, about 300V. In other words, the DC-DC converter 35 steps down the voltage that is output by the main converter 12 and is higher than the voltage suitable for charging of the power storage device 16, and the power storage device 16 is charged with the voltage suitable for charging of the power storage device 16.

Furthermore, the inverter controller 19 calculates the target torque of the electric motor 15 based on the power running notch N1 and the rotational speed of the electric motor 15 that is acquired from the speed sensor 24. Further, the inverter controller 19 calculates the actual torque of the electric motor 15 based on current values that are detected for the currents flowing in the phases of the electric motor 15 and are acquired from the current detector 23. Further, the inverter controller 19, in order to bring the actual torque close to the target torque, controls on/off operation of the multiple switching elements included in the first inverter 14. Thus, the electric motor 15 is driven in response to the operation command signal S2 on and after the time T4, to generate the railway-vehicle motive power. This enables running of the railway vehicle while charging the power storage device 16.

As described above, the drive control device 10 according to Embodiment 4 enables driving of the electric motor 15 after the internal combustion engine 2 is started.

Embodiments of the present disclosure are not limited to the aforementioned embodiments. Any of the embodiments described above may be combined. For example, the drive control devices 10 according to Embodiments 3 and 4 may further include the second inverter 31. Further, the drive control device 10 may further include another inverter that is connected to the secondary terminals of the main converter via a step-up circuit or a step-down circuit.

Circuit configurations of the driving apparatus 1 and the drive control device 10 are not limited to the above-described examples, and any circuit configurations may be employed. For example, the step-down circuit 17 may include a variable resistor. Setting a resistance value of the variable resistor after starting of the internal combustion engine 2 sufficiently larger than a resistance value of the variable resistor before starting of the internal combustion engine 2 enables stepping down of the voltage of the DC power output by the main converter 12 and supplying of the stepped-down DC power to the power storage device 16. Further, any step-down circuit can be arranged as the step-down circuit 17. For example, a switching regulator may be arranged. Moreover, the resistance values of the voltage dividing resistors R1 and R2 in the aforementioned embodiments are examples, and these values may be appropriately determined based on the output voltage of the main converter 12 and characteristics of the power storage device 16.

The control performed by the converter controller 18 is not limited to the above-described example. For example, by feedback of the output current of the main converter 12, the converter controller 18 may adjust the multiple switching elements included in the main converter 12. Further, the control performed by the inverter controller 19 is not limited to the above-described example. The speed sensor 24 may be omitted from the driving apparatus 1, and the inverter controller 19 may acquire the rotational speed of the electric motor 15 from an automatic train control (ATC) device.

Moreover, the inverter controller 19 may perform sensorless vector control by estimating the rotational speed of the electric motor 15.

The timings at which the step-down circuit controller 20 closes and opens the contactors Q1, Q2, and Q3 are not limited to the above-described examples. For example, the step-down circuit controller 20 may open the contactor Q3 when the power storage device 16 is sufficiently charged after the time T4. In this case, determination as to whether the storage device 16 is sufficiently charged may be made based on an estimated value of an amount of power stored in the power storage device 16 that is estimated using charging/discharging current, a terminal voltage of the secondary battery included in the power storage device 16, a temperature of the secondary battery, or the like. Further, the step-down circuit controller 20 included in the driving apparatus 1 according to Embodiment 4 may close the contactor Q4 when the operation command signal S2 indicates the power running notch. In other words, the step-down circuit controller 20 may close the contactor Q4 at the time T4 of FIG. 9.

Although examples are describe above of detecting a phase current for each of the U-phase, V-phase and W-phase using the current detectors 21, 23, and 24, phase currents of at least two phases among the U-phase, V-phase and W-phase may be detected.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Railway vehicle driving apparatus
2 Internal combustion engine
3 Internal-combustion-engine controller
4, 24 Speed sensor
10 Drive control device
11 Generator
12 Main converter
13 Filter capacitor
14 First inverter
15 Electric motor
16 Power storage device
17 Step-down circuit
18 Converter controller
19, 32 Inverter controller
20, 36 Step-down circuit controller
21, 23, 34 Current detector
22, 37 Voltage detector
31 Second inverter
33 Load device
35 DC-DC converter
D1 Diode
Q1, Q2, Q3, Q4 Contactor
R1, R2 Voltage dividing resistor

The invention claimed is:

1. A drive control device for controlling a railway vehicle driving apparatus for driving a railway vehicle using, as a motive power source, an internal combustion engine, the drive control device comprising:
   a main converter to (i) convert alternating current power supplied from a generator to a primary terminal thereof into direct current power and output the DC power from a secondary terminal thereof, the internal combustion engine driving the generator to generate and output the AC power, or (ii) convert DC power supplied to the secondary terminal into AC power and supply the AC power to the generator;
   a first inverter to convert the DC power output from the secondary terminal of the main converter into AC power and output the AC power to an electric motor;
   a step-down circuit to step down a voltage of the DC power output from the secondary terminal of the main converter and supply the stepped-down DC power to a power storage device; and
   a converter controller to control the power conversion performed by the main converter, wherein
   the main converter, when the converter controller acquires a start command providing instruction for starting of the internal combustion engine, converts DC power supplied from the power storage device into AC power and supplies the AC power to the generator,
   the main converter, after the internal combustion engine is started, converts the AC power output by the generator into DC power and supplies the DC power to the first inverter and the step-down circuit, and
   the first inverter, after the internal combustion engine is started and during charging of the power storage device, drives the electric motor by converting the DC power supplied from the main converter into AC power and supplying the AC power to the electric motor, the charging of the power storage device being performed by the step-down circuit (i) stepping down the voltage of the DC power supplied from the main converter and (ii) supplying the stepped-down DC power to the power storage device.

2. The drive control device according to claim 1, wherein
   the step-down circuit includes a DC-DC converter that steps down the DC power output from the secondary terminal of the main converter and supplies the stepped-down DC power to the power storage device,
   the drive control device further includes a step-down circuit controller to control power conversion performed by the DC-DC converter, and
   the DC-DC converter, after the internal combustion engine is started, steps down the DC power output by the main converter and supplies the stepped-down DC power to the power storage device.

3. The drive control device according to claim 1, wherein the converter controller, after the internal combustion engine is started by rotation of the generator receiving the supply of AC power from the main converter, increases the voltage of the DC power output by the main converter to a voltage for driving of the electric motor.

4. The drive control device according to claim 1, further comprising:
   a second inverter connected to the secondary terminal of the main converter, wherein
   the main converter, after the internal combustion engine is started, converts the AC power output by the generator into DC power and supplies the DC power to the first inverter, the second inverter, and the step-down circuit.

5. A railway vehicle driving apparatus comprising:
   the drive control device according to claim 1;
   an internal combustion engine;

a generator to (i) generate and output alternating current power by being driven by the internal combustion engine, or (ii) rotate the internal combustion engine by rotating by receiving AC power; and a power storage device that is connected to the secondary terminal of the main converter included in the drive control device via the step-down circuit.

6. The drive control device according to claim 2, wherein the converter controller, after the internal combustion engine is started by rotation of the generator receiving the supply of AC power from the main converter, increases the voltage of the DC power output by the main converter to a voltage for driving of the electric motor.

7. A drive control device for controlling a railway vehicle driving apparatus for driving a railway vehicle using, as a motive power source, an internal combustion engine, the drive control device comprising:

a main converter to (i) convert alternating current power supplied from a generator to a primary terminal thereof into direct current power and output the DC power from a secondary terminal thereof, the internal combustion engine driving the generator to generate and output the AC power, or (ii) convert DC power supplied to the secondary terminal into AC power and supply the AC power to the generator;

a first inverter to convert the DC power output from the secondary terminal of the main converter into AC power and output the AC power to an electric motor;

a step-down circuit to step down a voltage of the DC power output from the secondary terminal of the main converter and supply the stepped-down DC power to a power storage device; and a converter controller to control the power conversion performed by the main converter, wherein the main converter, when the converter controller acquires a start command providing instruction for starting of the internal combustion engine, converts DC power supplied from the power storage device into AC power and supplies the AC power to the generator, the main converter, after the internal combustion engine is started, converts the AC power output by the generator into DC power and supplies the DC power to the first inverter and the step-down circuit, the step-down circuit includes:
- a contactor connected to the power storage device and the main converter; and
- a voltage dividing resistor connected in parallel to the contactor, the drive control device further includes a step-down circuit controller to close and open the contactor, the step-down circuit controller closes the contactor when acquiring the start command, and the step-down circuit controller, after the internal combustion engine is started, opens the contactor.

8. The drive control device according to claim 7, wherein the first inverter, after the internal combustion engine is started and during charging of the power storage device, drives the electric motor by converting the DC power supplied from the main converter into AC power and supplying the AC power to the electric motor, the charging of the power storage device being performed by the step-down circuit (i) stepping down the voltage of the DC power supplied from the main converter and (ii) supplying the stepped-down DC power to the power storage device.

9. The drive control device according to claim 7, wherein the converter controller, after the internal combustion engine is started by rotation of the generator receiving the supply of AC power from the main converter, increases the voltage of the DC power output by the main converter to a voltage for driving of the electric motor.

10. The drive control device according to claim 7, further comprising:

a second inverter connected to the secondary terminal of the main converter, wherein the main converter, after the internal combustion engine is started, converts the AC power output by the generator into DC power and supplies the DC power to the first inverter, the second inverter, and the step-down circuit.

11. A railway vehicle driving apparatus comprising:

the drive control device according to claim 7;

an internal combustion engine;

a generator to (i) generate and output alternating current power by being driven by the internal combustion engine, or (ii) rotate the internal combustion engine by rotating by receiving AC power; and a power storage device that is connected to the secondary terminal of the main converter included in the drive control device via the step-down circuit.

12. The drive control device according to claim 8, wherein the converter controller, after the internal combustion engine is started by rotation of the generator receiving the supply of AC power from the main converter, increases the voltage of the DC power output by the main converter to a voltage for driving of the electric motor.

13. The drive control device according to claim 8, further comprising:

a second inverter connected to the secondary terminal of the main converter, wherein the main converter, after the internal combustion engine is started, converts the AC power output by the generator into DC power and supplies the DC power to the first inverter, the second inverter, and the step-down circuit.

14. A drive control device for controlling a railway vehicle driving apparatus for driving a railway vehicle using, as a motive power source, an internal combustion engine, the drive control device comprising:

a main converter to (i) convert alternating current power supplied from a generator to a primary terminal thereof into direct current power and output the DC power from a secondary terminal thereof, the internal combustion engine driving the generator to generate and output the AC power, or (ii) convert DC power supplied to the secondary terminal into AC power and supply the AC power to the generator;

a first inverter to convert the DC power output from the secondary terminal of the main converter into AC power and output the AC power to an electric motor;

a step-down circuit to step down a voltage of the DC power output from the secondary terminal of the main converter and supply the stepped-down DC power to a power storage device; and a converter controller to control the power conversion performed by the main converter, wherein the main converter, when the converter controller acquires a start command providing instruction for starting of the internal combustion engine, converts DC power supplied from the power storage device into AC power and supplies the AC power to the generator, the main converter, after the internal combustion engine is started, converts the AC power output by the generator into DC power and supplies the DC power to the first inverter and the step-down circuit, and the step-down circuit includes:

a diode that has an anode connected to the power storage device and a cathode connected to the secondary terminal of the main converter; and a voltage dividing resistor connected in parallel to the diode.

15. The drive control device according to claim 14, wherein the first inverter, after the internal combustion engine is started and during charging of the power storage device, drives the electric motor by converting the DC power supplied from the main converter into AC power and supplying the AC power to the electric motor, the charging of the power storage device being performed by the step-down circuit (i) stepping down the voltage of the DC power supplied from the main converter and (ii) supplying the stepped-down DC power to the power storage device.

16. The drive control device according to claim 14, wherein the converter controller, after the internal combustion engine is started by rotation of the generator receiving the supply of AC power from the main converter, increases the voltage of the DC power output by the main converter to a voltage for driving of the electric motor.

17. The drive control device according to claim 14, further comprising:

a second inverter connected to the secondary terminal of the main converter, wherein the main converter, after the internal combustion engine is started, converts the AC power output by the generator into DC power and supplies the DC power to the first inverter, the second inverter, and the step-down circuit.

18. A railway vehicle driving apparatus comprising:

the drive control device according to claim 14;

an internal combustion engine;

a generator to (i) generate and output alternating current power by being driven by the internal combustion engine, or (ii) rotate the internal combustion engine by rotating by receiving AC power; and a power storage device that is connected to the secondary terminal of the main converter included in the drive control device via the step-down circuit.

19. The drive control device according to claim 15, wherein the converter controller, after the internal combustion engine is started by rotation of the generator receiving the supply of AC power from the main converter, increases the voltage of the DC power output by the main converter to a voltage for driving of the electric motor.

20. The drive control device according to claim 15, further comprising:

a second inverter connected to the secondary terminal of the main converter, wherein the main converter, after the internal combustion engine is started, converts the AC power output by the generator into DC power and supplies the DC power to the first inverter, the second inverter, and the step-down circuit.

* * * * *